Aug. 30, 1966     KARL-HEINZ PAULSKI     3,269,525
BALL-JOINTED LINK CHAIN
Filed July 14, 1964
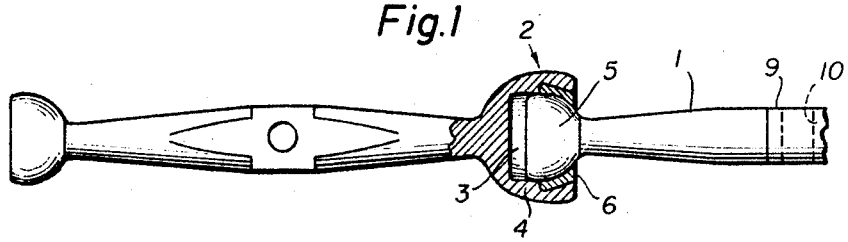
*Fig.1*
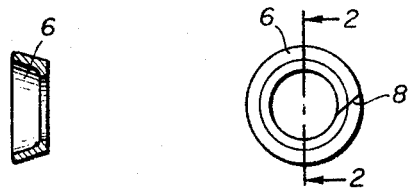
*Fig.2a*     *Fig.2*
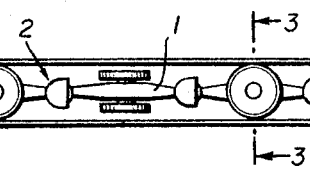
*Fig.3*
*Fig.3a*
INVENTOR:-
KARL-HEINZ PAULSKI
BY:- Jacob L. Kollin
ATTORNEY.

United States Patent Office 3,269,525
Patented August 30, 1966

3,269,525
BALL-JOINTED LINK CHAIN
Karl-Heinz Paulski, Nievern (Lahn), Germany, assignor to Drahtwerk C. S. Schmidt Aktiengesellschaft, Niederlahnstein (Rhine), Germany
Filed July 14, 1964, Ser. No. 382,604
2 Claims. (Cl. 198—189)

The present invention concerns a novel ball jointed link chain, which is especially suitable for conveying devices, wherein an endless closed chain with spatially displaceable properties is used as traction means.

In the conveying art, especially in the field of continous conveyors, chains of varying embodiments are used as traction means. For conveyors which require a spatial alignment spatially displaced traction means are thus employed.

Known as such are welded round steel link chains, especially strap and steel bolt chains, universal link chains and chains wherein the individual chain links are connected in the manner of ball joints.

In the case of round steel link chains a substantial disadvantage exists wherein the small mutual contact surfaces of the link chains which particularly with frequent bends leads to rapid wear and tear and consequently to an undesired varying of the chain pitch.

Spatially displaceably constructed known strap and steel bolt chains are limited in the range of application, since in a movement plane they allow only a slight curvature of the chain links, which to produce the spatial alignment necessitates considerable radii of curvature.

Universal joint chains are generally constructionally expensive and therefore connected with higher production costs. Added to this is the plurality of structural components which result in considerable maintenance.

Chains which, for obtaining spatial displaceability are provided with ball joint-like connections have heretofore found little use in conveying technique.

The reason for this is that in a proportion of known designs the construction for mounting and holding the chain elements is expensive, hence excluding economical manufacture, whilst the remaining designs in their joint part have an undesired high movement resistance, which has an adverse effect in practical operation.

According to the present invention a ball-jointed link chain especially for conveyor devices, wherein the force couple between the individual identically shaped chain links is produced by means of a ball socket serving as a counter-bearing, the latter being retained in its mounting seat by the component forces resulting from the tracking force of the chain, is characterised by the feature that each chain link is so constructed that one end of the link extends into a cut ball, whilst the opposite end has a cylindrical reinforcement having a bore extending axially inwards, acting as a mounting seat for a longitudinally slit ball mounting wherein the hemispherical end of the chain link to be coupled therewith is accommodated.

The invention will now be described further, by way of example, with reference to the accompanying drawings, in which:

FIG. 1 shows two chain links in spatially displaceable coupling;

FIG. 2 is a plan view of the ball mounting; FIG. 2a is a cross-section taken on line 2—2 of FIG. 2;

FIG. 3 shows a fragmentary view of a profile arc of a circular conveyor installation with internally operating chain, supported by rollers acting as guide and supporting rollers, and FIG. 3a is a cross-section taken on line 3—3 of FIG. 3.

The conveyor chain comprises individual identical chain links 1, which are connected together by means of ball socket assemblies, generally indicated as 2. Each chain link assembly is so constructed that in the direction of one of its ends it extends as a hemispherical member 5, while the opposite end provides a cylindrical reinforcement having a bore 3 extending axially therein. This bore at first widens conically at an angle of, for example, 15° into the chain link, the diameter in the bore inlet corresponding to the ball diameter at the other end of the chain link. The conical bore ends at a shoulder and continues with the original diameter, as illustrated in FIG. 1.

The ball socket 4 has a ball mounting 6 provided internally, the external wall of which corresponds to the conical shape of the bore in the chain link 1. The ball mounting 6 is separated on one side by means of a longitudinal slot 8, which extends diagonally inwards.

The central portion of the chain link is tensionally constructed and has a reinforced portion 9, which for example has a bore 10 to receive a carrier means.

The chain links, depending upon their intended use and manufacturing process, are produced from suitable metal or plastics material.

The coupling of two chain links is produced as described below.

The ball mounting 6 is bent up, which on account of its longitudinal slot 8 and resilient behaviour is possible, and slipped over the arm portion of the chain link 1 in such a manner that the mounting socket faces the ball portion of the chain link. Then the ball portion of the chain link is introduced to the cylindrical part of the chain link to be later coupled to the opposite end of an adjacent link. By pressing the ball mounting 6 it may be inserted in the open space between ball and conical cylinder wall of the ball socket 4. Owing to the natural elasticity of the material the ball mounting 6 snaps back into its original position and thereby with its outer surface is supported against the conical cylinder wall. The inserted chain link with its ball part can now be drawn into the seat of the ball mounting and simultaneously retained coupled therewith since owing to the force component from the chain pull the ball mounting 6 is urged firmly into the conical seat of the cylinder wall of the other chain link and adapted to be forcibly disengaged from this position only by overcoming the shearing resistance of the material of the ball socket.

The release of the connection of the two chain links is effected in such a manner that the inserted chain link with its ball part is slid to the end of the cylindrical bore 3 of the cylindrical part of the chain link to be released. This creates an open space between the ball part of one and the inner conical cylindrical wall of the other chain link. By means of a hook-shaped tool the ball mounting 6 can now be drawn out and then also the chain link.

I claim:

1. In a conveyor link chain, a plurality of links, one end of each of said links being formed as a hemispherical member, the other end having a bore extending axially therein, the diameter at the bore inlet corresponding to the diameter of the hemispherical member, said bore extending as a conical widened portion to a diameter greater than that at the bore inlet, said bore having an inwardly extending circular shoulder at said greater diameter having a diameter equal to that of the bore inlet, said bore extending further in cylindrical form a predetermined distance from said shoulder into said other end, a ball mounting in said conical widened portion, the external wall of said ball mounting corresponding to said conical widened portion, the internal wall of said mounting conforming to said hemispherical member, said ball mounting having a diagonally extending slot thereacross.

2. In a link chain according to claim 1, wherein the central portion of each of said links is provided with a reinforcement and supporting wheels mounted on each of said links intermediate the ends thereof.

References Cited by the Examiner

UNITED STATES PATENTS

| | | | |
|---|---|---|---|
| 420,341 | 1/1890 | Goodrich | 198—189 |
| 1,472,049 | 10/1923 | Clark | 198—189 X |
| 1,896,407 | 2/1933 | Hoefflear | 198—189 |
| 2,010,367 | 8/1935 | Lapsley | 287—87 |
| 2,646,160 | 7/1953 | Michna | 198—189 |
| 3,154,333 | 10/1964 | Townsend | 287—87 |

FOREIGN PATENTS 532,921  11/1956  Canada.

EVON C. BLUNK, *Primary Examiner.*

SAMUEL F. COLEMAN, *Examiner.*

R. M. WALKER, *Assistant Examiner.*